Patented Dec. 2, 1930

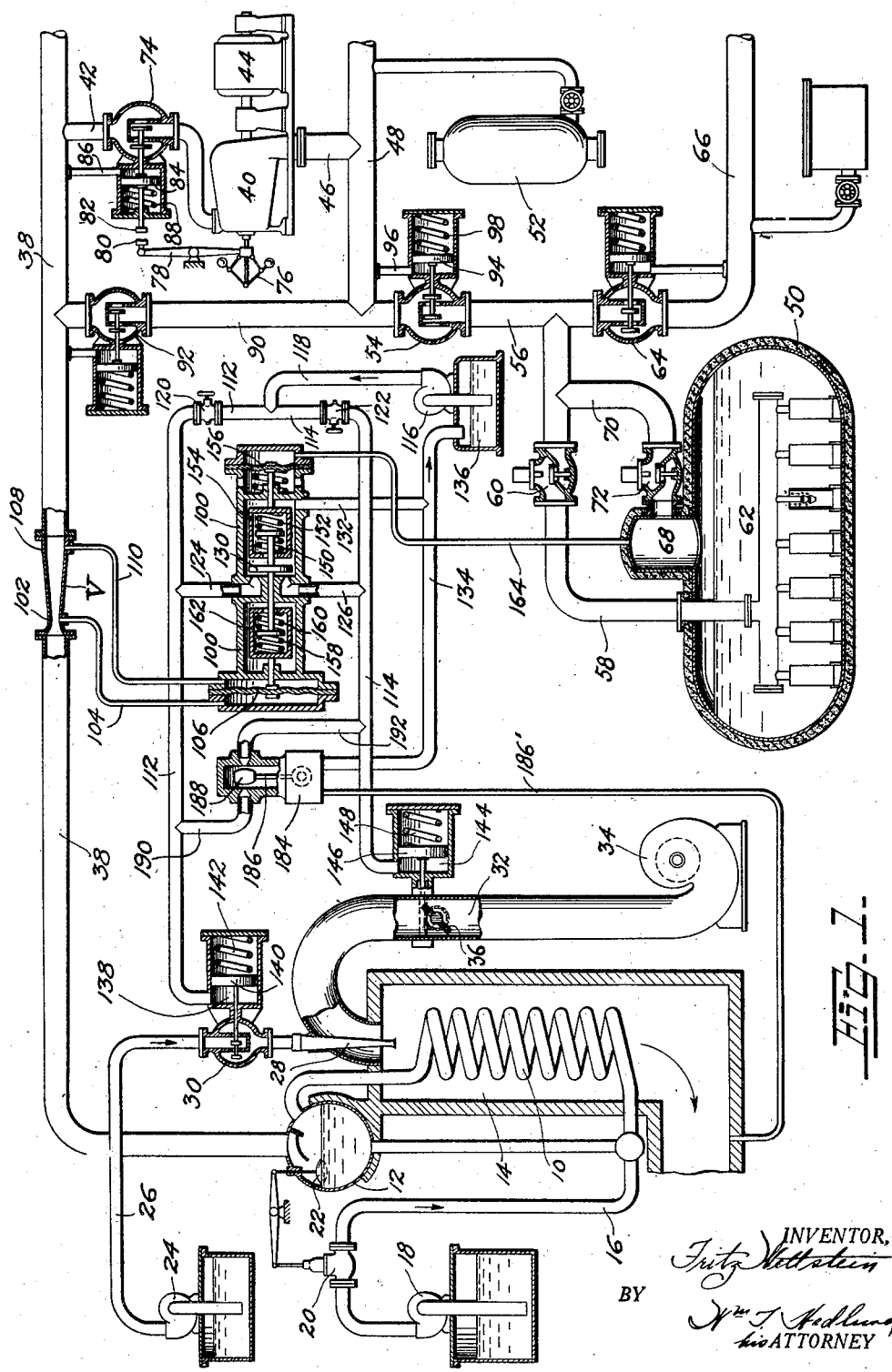

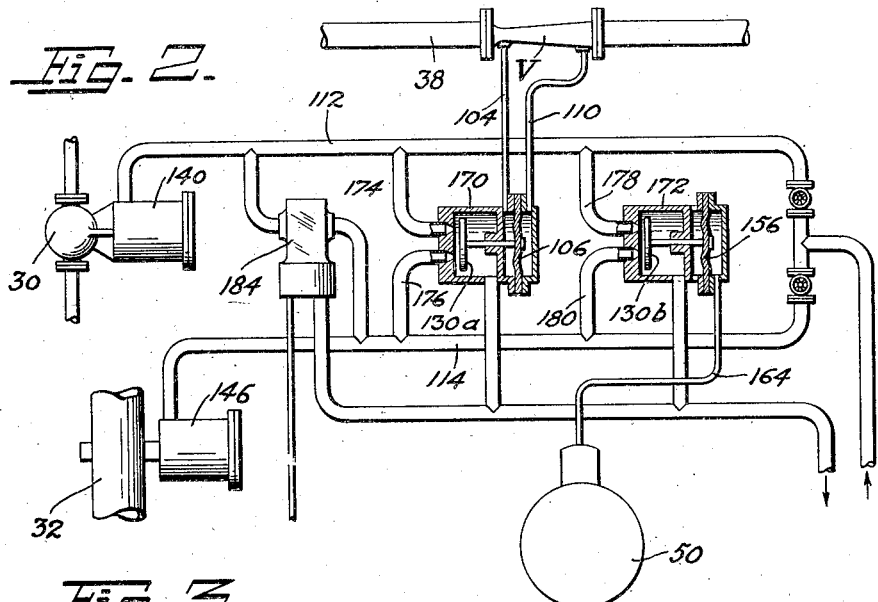
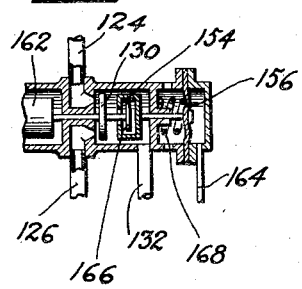
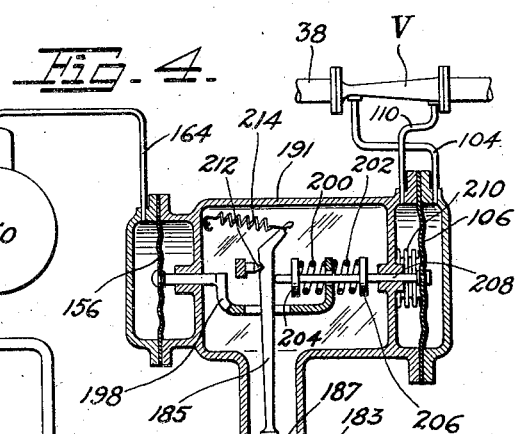
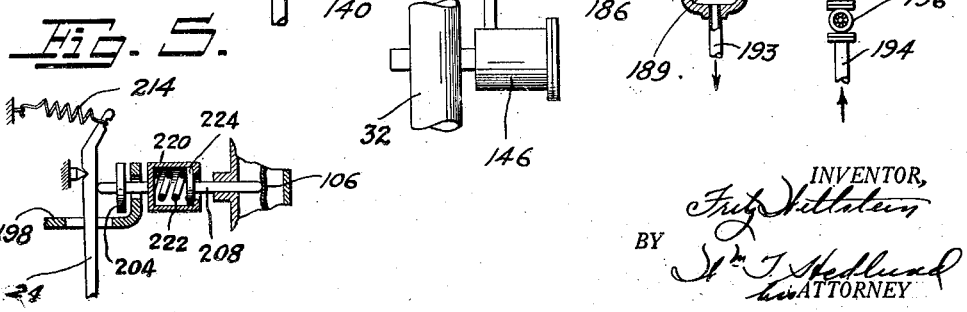

1,783,204

UNITED STATES PATENT OFFICE

FRITZ WETTSTEIN, OF SUMMIT, NEW JERSEY, ASSIGNOR, BY MESNE ASSIGNMENTS, TO RUTHS STEAM STORAGE INCORPORATED, OF NEW YORK, N. Y., A CORPORATION OF DELAWARE

STEAM PLANT

Application filed June 23, 1926. Serial No. 117,914.

My invention relates to steam plants and more particularly to plants wherein there is a variable demand for steam and wherein an accumulator is utilized to even out the variations in demand in such a manner that the boiler plant may be normally operated to generate steam at a constant rate.

Amongst the objects of my invention are:

To automatically regulate the supply of combustion material to a boiler plant in order to obtain a constant flow of steam from the boiler plant irrespective of demand for steam; to automatically regulate combustion in a boiler plant equipped with an accumulator so that steam is normally supplied to power generating apparatus at a constant rate; to automatically regulate combustion in an accumulator plant so that power generating apparatus is made independent of fireroom control; to effect a proportionate regulation of different factors of combustion in accordance with combustion conditions while regulating combustion in response to steam conditions in the plant; to regulate steam production in accordance with both pressure and flow of steam; and to modify combustion regulation in accordance with accumulator pressure in order to limit the condition of charge or discharge of the accumulator.

Further objects of the invention will be apparent as the description proceeds.

In the accompanying drawings which illustrate some forms of my invention: Fig. 1 shows a steam plant embodying my invention wherein supply of fuel to the boiler is regulated in accordance with variations of flow, variations of state of accumulation and variations in value of $CO_2$; Fig. 2 shows a modified regulating arrangement; Fig. 3 shows another modification which is distinctive in that it affords a control by flow independently of state of accumulation within certain limits; Fig. 4 shows a modified regulation relay arrangement; and Fig. 5 shows still another modified relay arrangement.

In Fig. 1, 10 designates a steam generator or boiler having a steam and water drum 12. The boiler is shown as of the coil type but may be of any construction. The heat absorbing section of the boiler is situated within a combustion chamber 14. Feed water is supplied to the boiler through conduit 16 by means of a pump 18. Flow through conduit 16 is controlled by a valve 20 operated in response to movement of a float 22 situated in drum 12, which float controls valve 20 in such a manner that a constant level of water is maintained in the boiler.

Combustion chamber 14 is supplied with oil by means of pump 24, through conduit 26 and nozzle 28. Flow of oil through conduit 26 is controlled by a valve 30. Combustion chamber 14 is supplied with air through duct 32 by means of blower 34. Flow of air through duct 32 is controlled by damper 36.

Steam generated in boiler 10 passes through high pressure conduit 38 and, in the arrangement shown, passes normally through conduit 42 and into and through motor 40 which is shown as a turbine driving an electric generator 44. Turbine 40 is a non-condensing back pressure turbine discharging through back pressure connection 46 into conduit 48 from which a steam consumer such as digestor 52 receives steam. The surplus of steam passing through connection 46 not consumed by the consumer or consumers connected to conduit 48 passes through overflow valve 54 into conduit 56 and thence, assuming that valve 64 is closed, through conduit 58, and check valve 60 therein, into accumulator 50, the steam being discharged into the water space 62 of the accumulator through a suitable charging apparatus. Valve 64 is a reducing valve controlled by changes of pressure in low pressure conduit 66. If valve 54 is closed and valve 64 is open steam passes from the steam space 68 of the accumulator through conduit 70 and check valve 72 therein, through valve 64 and into conduit 66 whence it passes to the consumers taking steam from this conduit.

Flow through conduit 42 is controlled by an over-flow valve 74 which is operated by variations of pressure in conduit 38 in such a manner that if the pressure rises in conduit 38 valve 74 is increased in flow opening and permits more steam to flow through conduit 42 thus reducing the pressure in conduit 38. Upon decrease of pressure in conduit 38 valve 74 closes more or less and thereby causes the pressure in conduit 38 to return to that value from which it departed for effecting the change of flow through conduit 42. Over-flow valve 74 is a regulating valve and may be made in various forms, the showing in Fig. 1 being merely diagrammatic and this type of valve being known to those skilled in the art. In normal operation this valve operates to maintain a constant or approximately constant pressure in conduit 38. This over-flow valve may, if desired, be made a part of turbine 40. The turbine is shown as equipped with a centrifugal governor 76 which is arranged to be normally inoperative but, upon on increase of speed of turbine 40 above a given normal value, to control flow through conduit 42 regardless of the operation of the over-flow valve. Centrifugal governor 76 is shown as operating a lever 78 carrying an abutment 80 which normally is out of contact with an abutment 82 arranged in connection with a member 84, shown as a piston which controls valve 74. If the speed of the turbine increases above a predetermined value abutments 80 and 82 can contact and the centrifugal governor can operate the valve 74 to close the same. Piston 84 which is acted upon on one side by the pressure in conduit 38 acting through tube 86, is acted upon, on the other side, by a spring 88. Obviously various well-known forms of pre-regulation may be applied to a regulating valve serving in this manner.

A by-pass conduit 90 is provided between conduits 38 and 48 which is controlled by an over-flow valve 92 operated in response to variations of pressure in conduit 38 but set to come into operation and allow passage of steam through conduit 90 at a pressure somewhat higher than the normal operating pressure of valve 74. If the speed governor 76 should close valve 74 despite a rise of pressure in conduit 38, valve 92 will open and allow a passage of steam through conduit 90 and, if the steam consumption is less than the steam supply, allow passage of steam to the accumultor, while maintaining a somewhat higher but constant pressure in conduit 38 than that constant pressure which would be maintained in conduit 38 by normal operation of valve 74.

Valve 54 may be any type of over-flow valve operating to maintain a constant pressure in conduit 48. For purposes of illustration I have shown this regulating valve as comprising a piston 94 acted upon, on one side, by pressure of conduit 48 transmitted through tube 96 and, on the other side, by a spring 98, the arrangement being such that an increase of pressure in conduit 48 opens valve 54.

Reference character 100 designates a relay which is operated in response to changes of rate of flow in conduit 38. As one arrangement for taking out flow impulses from conduit 38 and transmitting the same to the relay, I have shown a Venturi meter or tube V inserted in conduit 38 having a contracted portion 102 to which is connected a tube 104 which transmits a value of pressure to one side of diaphragm 106 in relay 100 which is equivalent to static pressure in the wide portion 108 of the Venturi meter reduced by the velocity component produced by the constriction. A tube 110 connects the enlarged portion of the Venturi meter with the other side of diaphragm 106 and the difference in pressure on the two sides of the diaphragm is a measure of flow through conduit 38.

Relay 100 controls valve 30 and damper 36. Various forms of force transmission for regulation may be used for this purpose but I prefer indirect transmission through the agency of a liquid and have shown one arrangement for effecting actuation in this manner. This actuation comprises liquid conduits 112 and 114 which are supplied with a liquid such as oil by means of a pump 116. Pump 116 discharges into a conduit 118 from which conduits 112 and 114 are branched off. Each of conduits 112 and 114 contains a restriction 120 and 122 respectively which constrictions serve to cause changes of pressure in conduits 112 and 114 upon change of outflow of liquid into relay 100 through conduits 124 and 126 which are connected to conduits 112 and 114 respectively. Discharge of liquid into relay 100 from conduits 124 and 126 is controlled by means of a baffling member 130 which is connected to diaphragm 106. The arrangement is such that an increase of velocity in conduits 38 causes a decrease of outflow through conduits 124 and 126 into relay 100. Liquid passes from relay 100 through conduits 132 and 134 into receptacle 136 from which pump 116 is supplied. Conduit 112 is connected to a servo-motor chamber 138 which is on one side of a piston 140, the other side of which is acted upon by a spring 142. Parts 138, 140 and 142 are parts of a servo-motor for the operation of valve 30 and are arranged so that an increase of pressure in conduit 112 causes a restriction of flow through valve 30. Conduit 114 is connected to a servo-motor chamber 144 formed on one side of a piston 146, the other side of which is acted upon by a spring 148, these parts constituting parts of a servo-motor for the actuation of damper 36. The arrangement is such that increase of pressure in conduit 114 causes the closing of damper 36.

The operation of the apparatus thus far described is as follows:

In this description of the operation of the apparatus it will be assumed that diaphragm 106 is the only agency actuating baffling member 130. It will be assumed that the two springs 150 and 152 in housing 154, which is connected to diaphragm 156, are omitted. The influence of the agency employing springs 150 and 152 will be later described. With the omission of these springs the arrangement will be as shown in Fig. 3. For purposes of the present description it may be assumed that springs 158 and 160 within housing 162 at the left hand side of baffling member 130, as shown in Fig. 1, are so stiff as to resist all movement.

Assume now, for some reason or other, that an increase of rate of flow of steam occurs in conduit 38. The result of this increase of flow will be a diminished pressure on the left hand side of diaphragm 106 with respect to the pressure on the right hand side of the same. This results in movement of diaphragm 106 to the left and a movement of baffling member 130 to the left. A leftward movement of baffling member 130 causes a restriction of outflow from conduits 124 and 126 into relay 100. This causes a rise of pressure in conduits 124, 126, 112 and 114. The pressure then rises in chamber 138 and the force of spring 142 is overcome and valve 30 is closed more or less whereby the supply of fuel oil to combustion chamber 14 is diminished. At the same time piston 146 is moved to the right due to increase of pressure in chamber 144 and damper 36 is closed to a greater or less extent as a result of which less air passes to combustion chamber 14. As a result of decrease of fuel oil and air to the combustion chamber, the rate of generation of steam in boiler 10 is diminished and the rate of flow of steam through conduit 38 is diminished. The regulation so far described therefore tends to maintain a constant rate of flow in conduit 38.

Although the above described arrangement for maintaining constant flow in conduit 38 may be used alone, it is preferred to have this regulation modified by a factor having a relation to the state of charge of the accumulator. This may be performed in various ways. I prefer to utilize the pressure in the accumulator as the factor for modifying the flow control mechanism hereinbefore described and, to this end, pressure variations in the accumulator are transmitted through tube 164 and act upon diaphragm 156. First I will explain the modification shown in Fig. 3 which is the same as that of Fig. 1 except for the omission of springs 150 and 152. Within housing 154 is a double acting abutment 166 which is adapted to be contacted by one side of housing 154 for one direction of movement and by the other side of housing 154 for the opposite direction of movement. So long as the pressure in the accumulator varies between certain limits, housing 154 will not contact with abutment 166 and, since abutment 166 is connected to baffling member 130, will not affect the regulation.

The pressure in the accumulator is a function of the state of charge of the accumulator. If the pressure is high, it is an indication that the heat reserve of the plant is high and less steam should be generated. Conversely, if the pressure in the accumulator is low, it indicates that the heat reserve of the plant is low and that steam should be generated at greater than the usual rate. With the arrangement herein described the relay 100 automatically takes care of this change of rate of steam generation so that a perfect heat balance is maintained in the plant. So long as the pressure in the accumulator remains within given limits there is no effect upon the flow control regulating mechanism. Should the pressure rise to a high value, diaphragm 156 is flexed to the left, as shown, against the opposed action of spring 168 to such an extent that the right end side of housing 154 contacts abutment 166 and moves baffling member 130 to the left regardless of the tendency of the flow control mechanism to maintain the baffling member in a given position or to move it to the right. To accomplish this purpose the mechanism transmitting the steam pressure in the accumulator should be of greater strength than the flow control mechanism and it is for this purpose that springs 158 and 160 are interposed in the connection between diaphragm 106 and baffling member 130. This gives some loose play which relieves strain. Movement of baffling member 130 to the left causes an increase of pressure in conduits 112 and 114 and reduces the intensity of boiler fire. The regulating mechanism thus operates to adjust the flow mechanism to a different value or to practically place it out of operation until steam has been consumed to such an extent that the heat reserve of the plant is returned to its normal working limits.

If the pressure in the accumulator should drop to a great extent, abutment 166 will be moved to the right, as shown in Figs. 1 and 3, and this results in an increase of fire intensity and an increase of steam flow through conduit 38. The increase of steam flow results in a recharging of the accumulator and this is continued until such time as diaphragm 156 is restored to such position that abutment 166 is not affected by housing 154.

By proper selection of parts, the regulation can be so adjusted that the effect of accumulator intervention upon the flow control mechanism is slow and gradual. The efficiency of the plant is thus maintained at a high value while regulation is effected to give a perfect heat balance.

While the plant may be operated with what may be termed limit regulation by the accumulator, I prefer to have a continuous and simultaneous interaction of the factors developed by changes of flow and changes of heat reserve. To this end springs 150 and 152 are interposed in housing 154. There is thus a joint cooperation of diaphragm 106 and diaphragm 156 as affecting baffling member 130. The result of this regulation will be a gradual slowly changing general curve of steam generation in accordance with the state of charge of the accumulator while lesser fluctuations are equalized by the flow control mechanism to give a slowly varying rate of fire intensity but substantially constant for a given increment of time. With this regulation, the accumulator determines the value of range of regulation of the flow control mechanism, while within this range the flow control mechanism operates to maintain constant flow.

In Fig. 2, an alternative modification is shown wherein the relay 100 is split up into two relays which are indicated by reference characters 170 and 172. Relay 170 is responsive to changes of flow occurring in conduit 38 as measured by the Venturi meter V. Relay 172 is responsive to changes of pressure occurring in the accumulator transmitted through tube 164. Each relay contains a baffling member, 130a and 130b rerespectively. These baffling members control outflow of liquid from conduits 174, 176, 178 and 180 which are connected to conduits 112 and 114 similar to conduits designated by like reference characters in Fig. 1. Changes of pressure in conduits 112 and 114 caused by cooperative working of relays 170 and 172 cause operation of the motors 140 and 146 which control movement of oil valve 30 and damper 36 respectively, as in Fig. 1.

The operation of the parallel relay arrangement of Fig. 2 will be evident from the above description of operation of the corresponding parts of Fig. 1.

Besides controlling the furnace fire in accordance with changes of flow and changes of state of charge of the accumulator, in order to obtain a yet higher efficiency, I control the relative supply of oil and air in accordance with $CO_2$ conditions in the furnace off-take flue. This may be accomplished by means of any of various known types of $CO_2$ meters. The $CO_2$ meter is designated generally by reference character 184 and it is affected by gas withdrawn through tube 186'. This device is such that rotation of arm 186 takes place in accordance with changes of $CO_2$. Attached to arm 186 is a baffling member 188 which serves to control outflow of fluid through conduits 190 and 192 which are connected to conduits 112 and 114 respectively. Assume that the $CO_2$ value decreases. Arm 186 is then moved so that baffling member 188 decreases the outflow through conduit 192 and allows more oil or other fluid to flow from conduit 190. This results in a relative increase of pressure in chamber 144 and decrease of pressure in chamber 138. The result is an increase in the proportion of oil supply to the proportion of air. Conversely a high value of $CO_2$ results in an increase of air supply relative to the fuel supply. The $CO_2$ regulator thus operates to maintain a constant value of $CO_2$ in the furnace gases.

Fig. 4 shows an arrangement wherein the flow impulse and the accumulator pressure impulse are caused to act upon a relay lever 185 which controls outflow from conduit 183 through opening 187, the lever being provided, for this purpose, with a projection 189. Preferably there are two projections one on each side of conduit 183. The lever and associated parts are enclosed in what may be termed a relay 191. Liquid entering the relay is discharged through conduit 193. Liquid is supplied to the relay through conduit 194 which is restricted by means of valve 196. Conduit 183 is connected to chambers 138 and 144 of Fig. 1. Movement of diaphragm 156 is transmitted through a bracket 198 which rests between two springs 200 and 202 which act against abutments 204 and 206 on a rod 208 which is connected to diaphragm 106. A bellows 210 is used to obviate the necessity for a stuffing box on the side of diaphragm 106 which is connected to rod 208. Lever 185 is pivoted on a fixed knifelike pivot 212 and is biased by a spring 214.

In the operation of the modification shown in Fig. 4, an increase of flow through conduit 38 results in movement of diaphragm 106 to the right and, assuming that lever 185 is in regulating position, a decreased outflow through opening 187. This increases the pressure in chambers 138 and 144 and the fire intensity is decreased.

Should the accumulator pressure rise diaphragm 156 is flexed to the right and the effective opening 187 is decreased as a result of which the pressure in chambers 138 and 144 is increased and the intensity of the fire is decreased. The reverse operation will be readily understood.

Fig. 5 shows an arrangement wherein springs 200 and 202 are eliminated in which case average variance of pressure in the accumulator will not affect the regulation. The operation of the modification shown in Fig. 5 is similar to that shown in Fig. 3. The left hand end of a housing 220 takes the place of abutment 206. The springs being omitted, the end of member 198 has free play between abutment 204 and member 220 for certain variations of pressure in the accumulator which therefore do not have any effect on the regulation induced by flow through member V. Should the accumulator pressure fall appreciably, member 198 will contact abutment 204 and modify the regulation as previously described. Conversely the reciprocal function will take place if the accumulator pressure rises to a high value. Should the latter occur, a resilient arrangement comprising spring 222, the housing 220, and disk 224 is provided to prevent undue strain or breakage of parts. If a certain stress, which is determined by spring 222, is placed on diaphragm 106, member 224 compresses spring 222. For what might be termed normal excess pressures at which the accumulator affects the regulation, the parts 208, 220, 222 and 224 act as a rigid member.

If desired the regulation responsive to changes of state of charge of the accumulator may be used individually and independently of the other arrangements herein described.

While I have described more or less in detail some embodiments of my invention it will be understood that the invention is not limited to what is herein described and illustrated.

Having thus described my invention, what I claim is:

1. In a steam plant, in combination, a steam generating section including a steam generator, a steam storage and steam utilization section including an accumulator, a passage for steam from said generator to said steam storage and steam utilization section, means to supply fuel to said generator and automatic means controlling the supply of fuel to maintain a constant rate of flow of steam from said generator through said passage.

2. In a steam plant, in combination, a steam generating section including a steam generator, means to supply fuel to said steam generator, a steam storage and steam utilization section including a steam motor, a steam accumulator, a consumer, a conduit for conducting steam from said motor to said accumulator and a conduit connecting said accumulator with said consumer, a passage for steam from said generator to said steam storage and steam utilization section and mechanism responsive to the rate of flow through said passage automatically controlling the fuel supply means to maintain a constant rate of flow of steam through said passage.

3. In a steam plant, in combination, a steam generator, a steam motor, a steam accumulator, a high pressure conduit connected to said generator, a motor supply conduit extending between said high pressure conduit and said motor, over-flow mechanism controlling flow of steam through said motor supply conduit and operating to maintain a constant steam pressure in said high pressure conduit, means to supply fuel to said generator, flow responsive mechanism actuated by changes in rate of flow through said high pressure conduit automatically regulating the supply of fuel to the generator to maintain a constant rate of flow of steam from said generator and through said high pressure conduit, means to conduct steam from said high pressure conduit to said accumulator and from said motor to said accumulator and means to discharge said accumulator.

4. In a steam plant, in combination, a steam generator, means to supply fuel to said steam generator, a steam motor, a steam accumulator, a passage for steam from said generator to said motor, mechanism responsive to the rate of flow through said passage controlling the fuel supply to the generator to maintain a constant flow from said generator and through said passage, a conduit for conducting steam from said motor to said accumulator and means to discharge said accumulator.

5. In a steam plant, in combination, a source of steam, a steam storage and steam utilization section comprising an accumulator, a passage for steam between said source and said steam storage and steam utilization section and automatic means to control the rate of flow of steam from said source toward said steam storage and steam utilization section and operating to maintain the rate of flow constant.

6. In a steam plant, in combination, a steam generating section including a steam generator, a steam storage and steam utilization section including an accumulator, a passage for steam between said generator and said steam storage and steam utilization section, means to supply fuel to said generator, automatic fluid pressure operated means to control the supply of fuel to the generator comprising a source of fluid under pressure, a relay to regulate the pressure of fluid in said automatic fluid pressure operated means and means responsive to changes in rate of flow of steam through said passage for operating said relay to maintain the rate of flow constant.

7. In a steam plant, in combination, a steam generator, means to supply fuel to said steam generator, a steam motor, a steam accumulator, a passage for steam from said generator to said motor, over-flow mechanism to control the flow of steam through said motor and operating to maintain a constant steam pressure in said passage, mechanism responsive to the rate of flow through said passage automatically controlling the supply of fuel to the generator to maintain a constant rate of flow of steam through said passage, a conduit for conducting steam from said motor to said accumulator and means to discharge said accumulator.

8. In a steam plant, in combination, a steam generating section comprising a steam generator, a steam storage and steam utilization section comprising an accumulator, a passage for steam from said generator to said steam storage and steam utilization section, means to supply fuel to said generator and automatic means to control the supply of fuel to the generator in response to changes in rate of flow of steam through said passage and in response to changes of state of charge of the accumulator.

9. In a steam plant, in combination, a steam generating section comprising a steam generator, a steam storage and steam utilization section comprising an accumulator, a passage for steam between said generator and said steam storage and steam utilization section, means to supply fuel to said generator and automatic means to control the supply of fuel to the generator in response to changes in rate of flow of steam through said passage and in response to changes of pressure within said accumulator.

10. In a steam plant, in combination, a steam generating section comprising a steam generator, a steam storage and steam utilization section comprising an accumulator, a passage for steam between said generator and said steam storage and steam utilization section, means to supply fuel to said generator, automatic means to control the supply of fuel and operated to maintain a constant rate of flow of steam through said passage and mechanism responsive to changes in the state of charge of said accumulator to modify the effect of said automatic means upon the supply of fuel.

11. In a steam plant, in combination, a steam generating section comprising a steam generator, a steam storage and steam utilization section comprising an accumulator, a passage for steam between said generator and said steam storage and steam utilization section, means to supply fuel to said generator, automatic means to control the supply of fuel and operated to maintain a constant rate of flow of steam through said passage and mechanism responsive to changes of pressure in said accumulator to modify the effect of said automatic means upon the supply of fuel.

12. In a steam plant, in combination, a steam generator, means to supply fuel to said steam generator, a steam motor, a steam accumulator, a consumer, a passage for steam from said generator to said motor, mechanism responsive to the rate of flow of steam through said passage to automatically control the fuel supply means, mechanism responsive to pressure in said accumulator for modifying the effect of the mechanism responsive to flow, a conduit for conducting steam from said motor to said accumulator and a conduit connecting said accumulator with said consumer.

13. In a steam plant, in combination, a steam generator, means to supply fuel to said steam generator, a steam motor, a steam accumulator, a passage for steam from said generator to said motor, mechanism responsive to the rate of flow through said passage to control the supply of fuel to the generator and operating to maintain a constant flow through said passage, means responsive to changes of pressure in said accumulator to modify the effect of the mechanism responsive to flow, a conduit for conducting steam from said motor to said accumulator and means to discharge said accumulator.

14. In a steam plant, in combination, a steam generating section comprising a steam generator, an accumulator, a steam storage and steam utilization section comprising a passage for steam from said generator to said steam storage and steam utilization section, means to supply fuel to said generator, automatic fluid pressure operated means to control the supply of fuel to the generator comprising a source of fluid under pressure, a relay to regulate the pressure of fluid in said automatic fluid pressure operated means, mechanism in said relay responsive to changes in rate of flow through said passage to operate said relay and mechanism in said relay responsive to changes of state of charge of said accumulator to operate said relay.

15. In a steam plant, in combination, a steam generating section comprising a steam generator, a steam storage and steam utilization section comprising an accumulator, a passage for steam between said generator and said steam storage and steam utilization section, means to supply fuel to said generator, automatic fluid pressure operated means to control the supply of fuel to the generator comprising a source of fluid under pressure, a member to regulate the pressure of fluid in said automatic fluid pressure operated means, mechanism responsive to changes in rate of flow of steam through said passage and mechanism responsive to changes in the state of charge of the accumulator, said mechanisms being arranged to act jointly upon said member.

16. In a steam plant, in combination, a steam generator, an accumulator, a passage for steam between said generator and said accumulator, means to discharge the accumulator, means to supply fuel to said generator and automatic mechanism responsive to changes in the state of charge of said accumulator to vary the supply of fuel to the generator and operating to prevent extreme values of the state of charge of the accumulator.

17. In a steam plant, in combination, a steam generator, a steam motor, a steam accumulator, a high pressure conduit connected to said generator, a motor supply conduit extending between said high pressure conduit and said motor, over-flow mechanism controlling flow of steam through said motor supply conduit and operating to maintain a constant steam pressure in said high pressure conduit, means to supply fuel to said generator, pressure responsive mechanism actuated by changes in the state of charge of said accumulator to automatically vary the supply of fuel to the generator, means to conduct steam from said motor to said accumulator and means to discharge said accumulator.

18. In a steam plant, in combination, a steam generating section comprising a steam generator, a steam storage and steam utilization section comprising an accumulator, a passage for steam from said generator to said steam storage and steam utilization section, means to supply fuel to said generator, automatic fluid pressure operated means to control the supply of fuel to the generator comprising a source of fluid under pressure, a relay member to regulate the pressure of fluid in said automatic fluid pressure operated means, a diaphragm responsive to changes in rate of flow of steam through said passage, a second diaphragm responsive to changes of pressure in said accumulator, a connection between the first mentioned diaphragm and said relay member and a yieldable connection between said second diaphragm and said relay member.

19. In a steam plant, in combination, a steam generating section comprising a steam generator, a steam storage and steam utilization section comprising an accumulator, a passage for steam from said generator to said steam storage and steam utilization section, means to supply fuel to said generator, automatic liquid pressure operated means to control the supply of fuel to the generator comprising a source of liquid under pressure, said liquid pressure operated means including a relay and means to discharge a restricted flow of liquid into said relay, a baffling member to control the discharge of liquid, a diaphragm responsive to changes in rate of flow of steam through said passage, a second diaphragm responsive to changes in pressure in said accumulator and means whereby movement of both diaphragms are caused to effect said baffling member.

20. In a steam plant, in combination, a steam generator, means to supply fuel to said steam generator, a steam motor, a steam accumulator, a passage for steam from said generator to said motor, mechanism responsive to the rate of flow of steam through said passage automatically controlling the fuel supply means to maintain a constant rate of flow of steam through said passage, means responsive to values of $CO_2$ for varying the proportions of fuel ingredients supplied, a conduit for conducting steam from said motor to said accumulator and means to discharge said accumulator.

21. In a steam plant, in combination, a steam generating section comprising a steam generator, a steam storage and steam utilization section comprising an accumulator, a passage for steam from said generator to said steam storage and steam utilization section, means to supply fuel ingredients to said generator and automatic means controlling the supply of fuel to maintain a constant rate of flow of steam through said passage while varying the relative proportions of ingredients of fuel supplied to maintain a constant value of $CO_2$.

22. In a steam plant, in combination, a steam generating section comprising a steam generator, a steam storage and steam utilization section comprising an accumulator, a passage for steam between said generator and said steam storage and steam utilization section, means to supply fuel to said generator and automatic means controlling the supply of fuel in response to flow of steam, state of charge of the accumulator and combustion conditions to maintain a constant rate of flow of steam through said passage.

In testimony whereof I hereby affix my signature.

FRITZ WETTSTEIN.